(12) United States Patent
Watanabe et al.

(10) Patent No.: US 7,907,695 B2
(45) Date of Patent: Mar. 15, 2011

(54) NATURAL CIRCULATION BOILING WATER REACTOR AND HANDLING METHOD THEREOF

(75) Inventors: Atsushi Watanabe, Hitachiota (JP); Yoichi Wada, Hitachinaka (JP); Makoto Nagase, Mito (JP); Kazushige Ishida, Hitachi (JP); Hideyuki Hosokawa, Hitachinaka (JP); Fumihito Hirokawa, Hitachi (JP); Masaaki Tsubaki, Hitachi (JP); Shiro Takahashi, Hitachi (JP)

(73) Assignee: Hitachi-GE Nuclear Energy, Ltd., Ibaraki-ken (JP)

( * ) Notice: Subject to any disclaimer, the term of this patent is extended or adjusted under 35 U.S.C. 154(b) by 0 days.

(21) Appl. No.: 11/680,072

(22) Filed: Feb. 28, 2007

(65) Prior Publication Data

US 2007/0201607 A1    Aug. 30, 2007

(30) Foreign Application Priority Data

Feb. 28, 2006 (JP) ................................. 2006-051501

(51) Int. Cl.
*G21C 3/56* (2006.01)
(52) U.S. Cl. ....................................... 376/389; 376/399
(58) Field of Classification Search .................. 376/389, 376/399
See application file for complete search history.

(56) References Cited

U.S. PATENT DOCUMENTS

| | | | | |
|---|---|---|---|---|
| 4,309,250 A | * | 1/1982 | Bradley | 376/310 |
| 5,180,546 A | * | 1/1993 | Van Kuijk | 376/371 |
| 5,406,597 A | * | 4/1995 | Fennern et al. | 376/232 |
| 5,857,006 A | | 1/1999 | Oosterkamp et al. | |
| 2003/0053582 A1 | * | 3/2003 | Nakayama et al. | 376/409 |

FOREIGN PATENT DOCUMENTS

| | | | |
|---|---|---|---|
| GB | 2251974 A | * | 7/1992 |
| JP | 02-268294 | | 11/1990 |

* cited by examiner

*Primary Examiner* — Rick Palabrica
*Assistant Examiner* — Erin M Boyd
(74) *Attorney, Agent, or Firm* — Antonelli, Terry, Stout & Kraus, LLP.

(57) ABSTRACT

A natural circulation boiling water reactor provides to a chimney with a plurality of tubes. That is to say, each of the plurality of tubes partitions the coolant flow path above a core. Thus, unlike the conventional natural circulation boiling water reactor providing the flow path partition wall grid in which the plate members are made integral by welding and coolant flow paths are partitioned, the chimney of the natural circulation boiling water reactor can reduce the number of welded portions because the edges of the four corners of each flow path do not need to be welded. The natural circulation boiling water reactor can avoid removal as a single unit, as in the case of the flow path partition wall grid in the conventional natural circulation boiling water reactor, by detaching each tube. The chimney can be easily detached from the reactor pressure vessel.

8 Claims, 8 Drawing Sheets

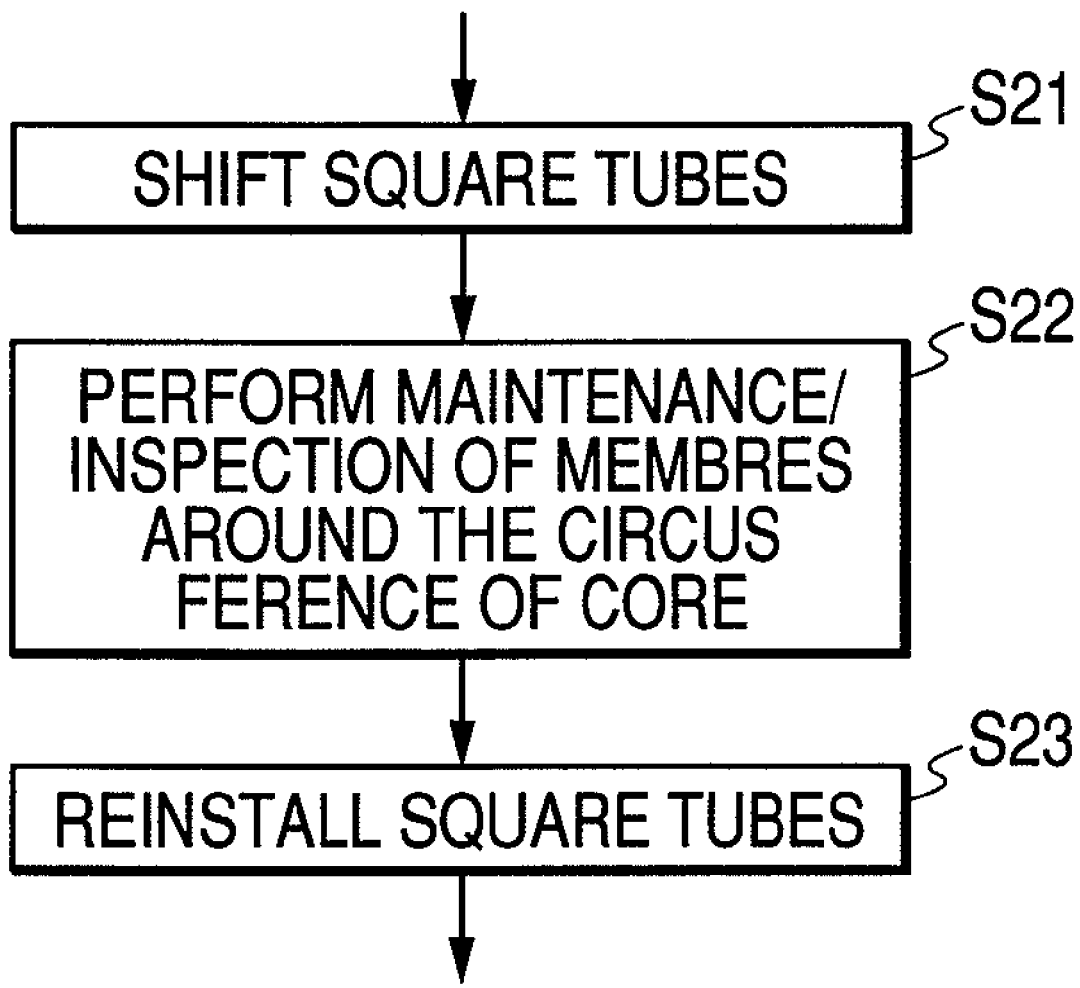

NATURAL CIRCULATION BOILING WATER REACTOR AND HANDLING METHOD THEREOF

CLAIM OF PRIORITY

The present application claims priority from Japanese application serial no. 2006-051501, filed on Feb. 28, 2006, the content of which is hereby incorporated by reference into this application.

BACKGROUND OF THE INVENTION

The present invention relates to a natural circulation boiling water reactor and a handling method thereof.

The conventional natural circulation boiling water reactor is known in which a chimney is disposed above the core inside the reactor pressure vessel (see Japanese Patent Publication No. Hei 7-27051 for example). The chimney has a function for promoting natural circulation of the coolant in the reactor pressure vessel by introducing the coolant which is two-phase flow including gas and liquid and is exhausted from a core, to an upper portion in the reactor pressure vessel. This conventional chimney is formed of flow path partitions that are disposed in the reactor pressure vessel. FIG. 8a is a perspective view showing the conventional chimney and FIG. 8b shows cross section taken along a line Z-Z in FIG. 8a. As shown in FIG. 8a, the conventional chimney 211 forms flow paths 211a of the coolant by a plurality of division of the inside of the reactor pressure vessel (not shown), along the vertical direction thereof. As shown in FIG. 8b, the flow path partition walls 211b form grids in the cross sectional view and the flow paths 211a form a square shape. The flow path partition walls 211b are assembled as a grid of plate members of stainless steel for example and are integrally formed by welding at the position of intersection of each plate member

SUMMARY OF THE INVENTION

It is to be noted that as shown in FIG. 8b, edges of each of four corners of the chimney 211 (flow path partition walls 211b) in the conventional natural circulation boiling water reactor are welded. However, stress tends to concentrate at the edges of the flow path 211a due to flow-induced vibration (FIV) and the like. There is a possibility that stress corrosion cracking (SCC) will occur at the welded portion 240 where the stress has concentrated. Thus a natural circulation boiling water reactor in which the chimney 211 has a reduced number of welded portions 240 is desired.

Furthermore, generally when the chimney in the natural circulation boiling water reactor is repaired or replaced, the chimney is taken out from the reactor pressure vessel. However, in the chimney of the conventional natural circulation boiling water reactor, because the flow path partition wall is heavy and has a length of a few meters in the vertical direction, and are integrally formed by welding the plate members, removing the flow path partition walls from the reactor pressure vessel requires a great amount of stress and time.

In the natural circulation boiling water reactor when maintenance and inspection such as checking, repair and processing of the parts around the core such as a core shroud and the like is performed, the chimney is taken out from the reactor pressure vessel. Thus, handling of the natural circulation boiling water reactor at the time of maintenance and inspection such as this checking, repair and processing is extremely complicated.

The object of the present invention is to provide a natural circulation boiling water reactor in which a number of welded portions of a chimney can be reduced and the chimney can be easily detached from the reactor pressure vessel.

The present invention for attaining the above object is characterized in that the natural circulation boiling water reactor provides to a chimney with a plurality of tubes. That is to say, each of the plurality of tubes partitions the coolant flow path above a core. Thus, unlike the conventional natural circulation boiling water reactor providing the flow path partition wall grid in which the plate members are made integral by welding and coolant flow paths are partitioned, the chimney of the natural circulation boiling water reactor of the present invention can reduce the number of welded portions because the edges of the four corners of each flow path do not need to be welded. The natural circulation boiling water reactor of the present invention can avoid removal as a single unit, as in the case of the flow path partition wall grid in the conventional natural circulation boiling water reactor, by detaching each tube.

According to the present invention, because the number of welded portions can be reduced, the number of productions steps and the manufacturing cost when manufacturing the natural circulation boiling water reactor can be reduced, and generation of stress corrosion cracking and the like can be prevented. According to the present invention, because the tubes which form the chimney can be removed individually, maintenance and inspection of the chimney itself as well as structure members around the core can perform easily.

BRIEF DESCRIPTION OF THE DRAWINGS

FIG. 2c is a sectional view taken along a line Y-Y in FIG. 2a.

FIG. 6 is a process chart for performing maintenance and inspection.

FIG. 8b is a sectional view taken along a line Z-Z in FIG. 8a.

DESCRIPTION OF THE PREFERRED EMBODIMENT

A natural circulation boiling water reactor according to an embodiment of the present invention will be described in details with reference to FIG. 1 to FIG. 3.

After outlines of the natural circulation boiling water reactor are described, the chimney included in the natural circulation boiling water reactor will be described.

(Natural Circulation Boiling Water Reactor Outline)

Generally, two types of boiling water reactors are used based on the difference in the method for supplying the coolant (cooling water) to a core. In one method, the coolant is circulated by force using a recirculation pump, and in the other method, a recirculation pump is not used and the coolant is circulated naturally. The boiling water reactor of the present embodiment is the natural circulation boiling water reactor of the latter case. FIG. 1, which will be used here, is an explanatory diagram showing the natural circulation boiling water reactor according to the present embodiment.

Figure 1:
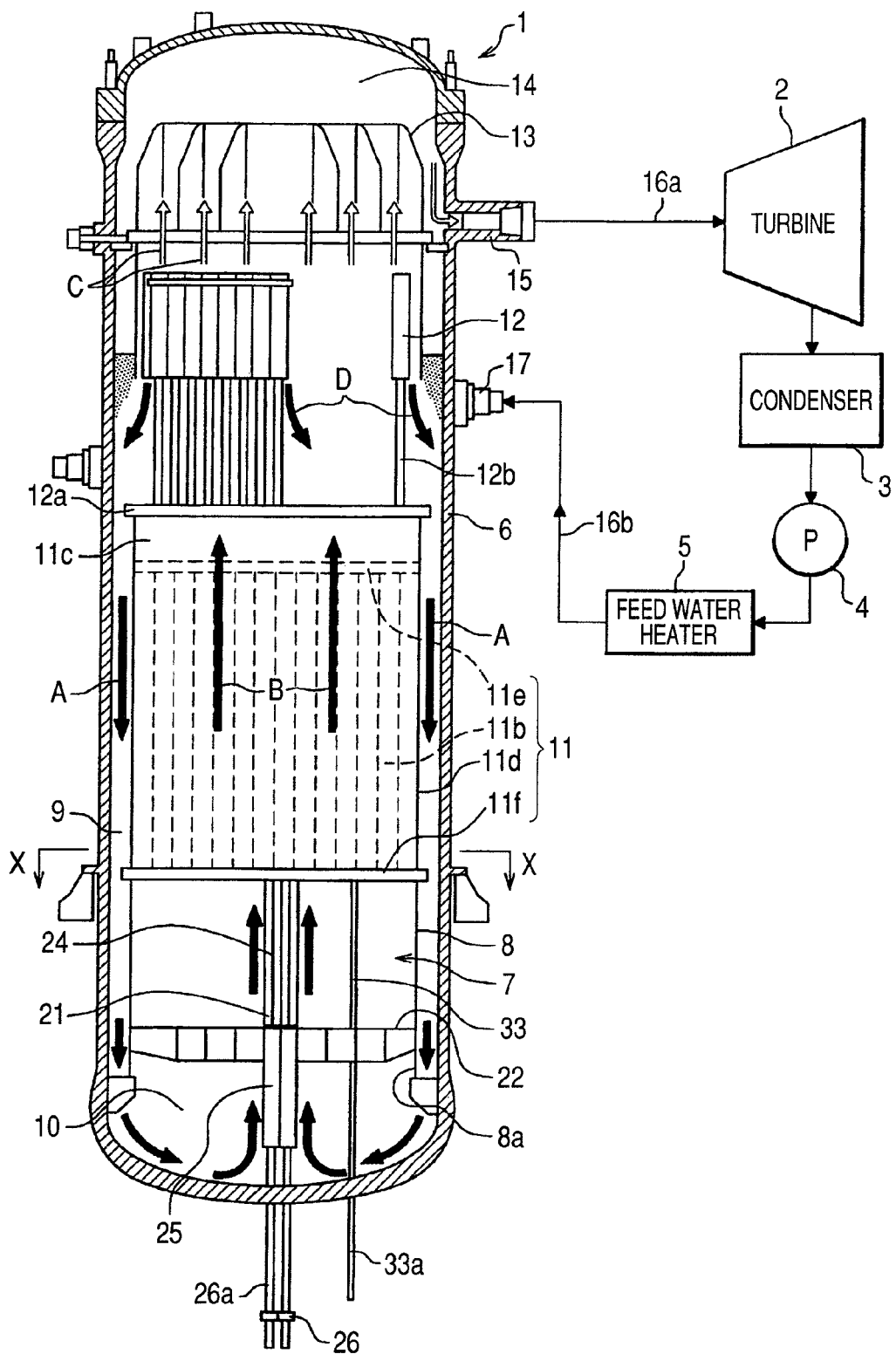
FIG. 1 is a structural diagram showing a natural circulation boiling water reactor according to an embodiment of the present invention.

As shown in FIG. 1, the natural boiling water reactor (referred to as reactor hereinafter) 1 obtains the required circulation force for natural circulation of the coolant due to specific gravity difference between coolant of low density being two-phase flow including gas and liquid and coolant of the liquid phase. The liquid phase coolant includes feed water from a feed water pipe 16b and the low density coolant separated by a steam separator 12. The coolant of the two-phase flow includes mixed the void, or in other words the steam (gas phase) generated in the core 7 stored in a reactor pressure vessel (referred to as pressure vessel) 6 hereinafter and coolant being the liquid phase coolant at saturation temperature.

As shown in FIG. 1, The reactor 1 provides the pressure vessel 6 and a cylindrical core shroud 8 disposed so as to be concentric inside the pressure vessel 6. The core shroud 8 has a circular space formed between an outside surface thereof and an inside surface of the pressure vessel 6. A downcomer 9 is formed by this circular space and another circular space formed between the inside surface of the pressure vessel 6 and an outside surface of the chimney shell 11d. The core 7 loading a plurality of fuel assemblies 21 is disposed in the core shroud 8.

A circular feed water sparger (not shown) is above the downcomer 9 inside the pressure vessel 6. The circular feed water sparger feeds coolant into the pressure vessel 6 after the coolant is pumped into a feed water heater 5 from a condenser 3 by a feed water pump 4 and heated and then supplied into the pressure vessel 6 through a feed water nozzle 17 connected to the feed water pipe 16b. The core 8 is supported by shroud support legs 8a. The coolant which descends the downcomer 9 is introduced to a core lower plenum (called lower plenum hereinafter) 10 located under the core 8 from the flow paths between the shroud support legs 8a.

A core plate 22 is provided under the core 7. A first grid support plate 11f which forms the chimney 11 described hereinafter is provided above the core 7. As described below, this first grid support plate 11f functions as the top guide of the conventional reactor and determines the cross-direction position of the core support plate 22 as well as the fuel assemblies 21 and control rods 24.

The core plate 22 has circular penetration holes (not shown) at prescribed intervals and the control rod guide tubes 25 are inserted into these penetration holes. The lower portion of the control rod guide tube 25 combines with the upper portion of a control rod drive mechanism housing (called CRD housing hereinafter) 26a which installs a control rod drive mechanism (called CRD hereinafter) 26. The CRD 26 penetrates the bottom of the pressure vessel 6, joins the control rod 24 and moves the control rod 24 in the vertical direction.

Four fuel assemblies 21 is supported by a fuel support (not shown) that is mounted on the upper end portion of the control rod guide tube. Load of the fuel assemblies 21 is transmitted to the bottom of the pressure vessel 6 via the control rod guide tube 25 and the CRD housing 26a.

As is known, the fuel support (not shown) has four coolant inlets at the side wall. Orifices that are provided at the coolant inlets respectively limit the coolant flow rate. The control rod guide tube 25 has four openings at a position corresponding to the coolant inlets of the fuel support respectively. By flowing through this opening, the coolant supplied to the lower plenum 10 is further introduced in each fuel assembly 21 via the fuel support through the orifice and the opening of the control rod guide tube 25.

Each fuel assembly 21 has a fuel bundle and a channel box (not shown) being square cylinder. The fuel bundle is enclosed by square cylinder channel box. Individual flow paths are formed in each channel box in the vertical direction thereof. Because the upper ends of the channel box are bound at the lower portion of the first grid support plate 11f, the fuel assembly 21 determines the cross-direction position as described above.

The control rod 24 comprises an effective portion which includes a neutron absorber (not shown) and the effective portion is inserted between the fuel assemblies 21 by being guided at the outer surface of the channel box.

A plurality of local power range monitor (LPRM) detector assemblies (simply called LPRM hereinafter) 33 are arranged in the core 7. The LPRM has a plurality of neutron detectors and measures the neutron flux of the power region. The lower portion of the LPRM 33 is housed at the in-core monitor housing 33a which passes through the penetration hole formed at the bottom of the pressure vessel 6 and the signal cable (not shown) comes out from the lower end of the in-core monitor housing 33a. A chimney 11 which will be described in detail hereinafter is disposed above the core 7. The upper end of the chimney shell 11d which forms the chimney 11 is closed by the shroud head 12a. At the upper portion in the chimney shell 11d, the upper plenum 11c is partitioned between the shroud head 12a and the second grid support plate 11e which forms the chimney 11a. The coolant is come in the upper plenum 11c through grid holes 41b described hereinafter (see FIG. 2b) formed in the second grid support plate 11e. A plurality of holes (not shown) through which the coolant is passed are formed in the shroud head 12a. The holes connect with the steam separator 12 via the stand pipe 12b. The steam separator 12 separates the coolant coming out of the holes formed in the shroud head 12a in the flow state of two-phase flow including saturated steam and saturated water.

A steam dryer 13 is disposed above the steam separator 12. The steam dyer 13 removes the moisture content being included in the saturated steam separated at the steam separator 12. The saturated steam exhausted from the steam dryer 13 is supplied to the turbine 2 via a steam dome 14, a steam outlet nozzle 15, and a main steam pipe 16a.

It is to be noted that the shroud head 12a, stand pipe 12b and steam separator 12 are assembled as a single unit and at the time of fuel exchange, they can be removed from the chimney 11 as one unit.

(Chimney)

As shown in FIG. 1, the chimney 11 introduces the coolant exhausted from the core 7 in the flow state of two-phase flow including gas and liquid above the pressure vessel 6. Natural circulation of the coolant in the pressure vessel 6 is thereby promoted.

The chimney 11 mainly comprises the chimney shell 11d, the square tube 11b, the first grid support plate 11f (grid support plate) and the second grid support plate 11e. It is to be noted that the square tubes 11b are the "tubes" referred to in the scope of the claims and the first grid support plate 11f is the "grid support plate".

As shown in FIG. 1, the chimney shell 11d is disposed above the core 7 in the pressure vessel 6, and is formed of a cylindrical member. The chimney shell 11d is disposed so as to be concentric with the pressure vessel 6.

A plurality of square tubes 11b is disposed in the chimney shell 11d so as to extend in the vertical direction. As described hereinafter, an upper ends of the square tubes 11b are supported around the circumference of grid holes 41b (see FIG. 2b) formed in the second grid support plate 11e. The lower ends of the square tubes 11b are supported around the circumference of the grid holes 41a (see FIG. 2b) formed in the first grid support plate 11f.

Figure 2A:
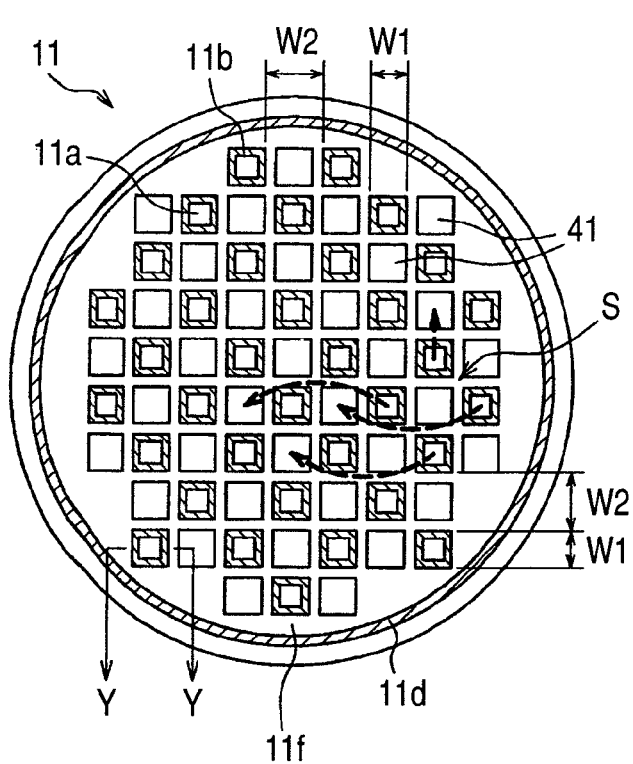
FIG. 2a is a sectional view taken along a line X-X in FIG. 1.
Figure 2B:
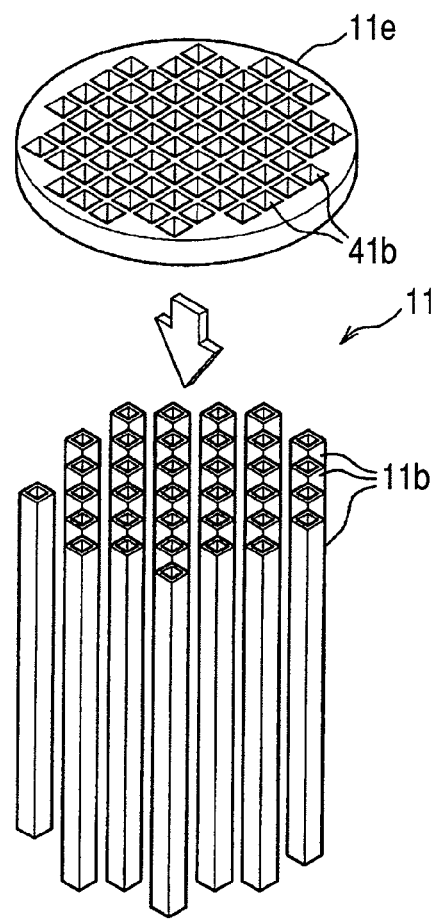
FIG. 2b is a disassembled perspective view of a chimney shown in FIG. 1.
Figure 2C:
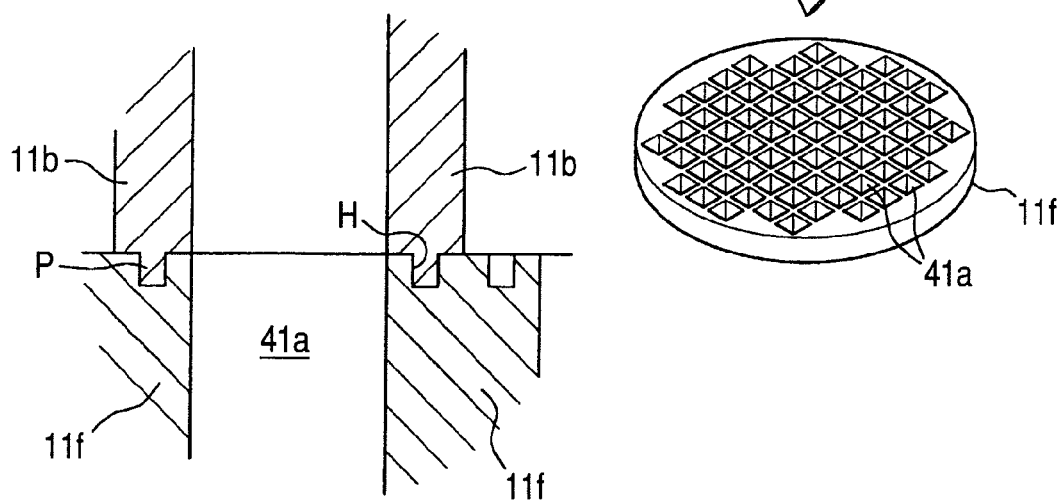

Next, the arrangement of the square tubes 11b in the chimney shell 11d will be described in further detail. FIG. 2a shows a cross-section of the chimney taken along a line X-X in FIG. 1. FIG. 2b is a disassembled perspective view of the chimney. FIG. 2c shows a cross-section taken along a line Y-Y in FIG. 2a. However, in FIGS. 2a-2c the chimney shell is omitted for the sake of convenience.

As shown in FIG. 2a, the square tubes 11b of this embodiment are formed such that the outline is that of a square in the cross-section and are disposed at W2 intervals exceeding the width W1 of each square tube in the rows and columns. More specifically, by arranging a square tube 11b in every other grid hole 41a formed in the first grid support plate 11f, the interval W2 between the square tubes 11b comes to exceed the width W1 of each square tube so that as illustrated in FIG. 2a, the arrangement of the square tubes 11b of one row are offset with respect to the arrangement of the squares tubes 11b of an adjacent row. The square tubes 11b are arranged in this manner, so leaving space S between the edges of the adjacent square tubes 11b.

As shown in FIG. 2b, the first grid support plate 11f is formed of a disc-like member. The grid hole 41a is formed which penetrates this member in the thickness direction. The planar configuration of the grid hole 41a has substantially the same configuration as the cross-section configuration of the inside space of the square tube 11b, or in other words, is square-shaped. There is a plurality of grid holes 41a so as to be aligned in the surface of the first grid support plate 11f. The interval of the grid hole 41a is set to be a distance at which the square tubes 11b do not interfere with each other when the adjacent grid holes 41a support the square tubes 11b.

At the opposite surface (lower surface) of one surface (upper surface) of the first grid support plate 11f which supports the square tubes 11b, the upper end portion of the fuel assembly 21 (channel box) is fit into the opening of the grid hole 41a, to thereby bind the fuel assembly 21 at the first grid support plate 11f.

As shown in FIG. 1, the first grid support plate 11f is disposed in the pressure vessel 6, and thus the coolant exhausted from the core 7 in the flow state of two-phase flow including gas and liquid will be introduced in the chimney shell 11d via the grid hole 41a.

This type of structure in which the first grid support plate 11f supports the square tubes 11b is preferably a structure in which the square tubes 11b are supported so as to be detachable. As shown in FIG. 2c, one example comprises the circular groove H which is formed in the first grid support plate 11f and the protruding rib P of the square tube 11b which fits into the groove H. The groove H is formed around the circumference of the grid hole 41a of the first grid support plate 11f so as to be along the outline of its square shape. The protruding rib P is formed at the lower end of the square tube 11b so as to correspond to the groove H.

By the square tube 11b being supported at the first grid support plate 11f, the inside of the square pipes 11b and the grid hole 41a are connected. It is to be noted that the structure in which the first grid support plate 11f supports the square tubes 11b may be one in which the first grid support plate 11f and the square tube 11b are fastened by fastening devices such as bolts.

As shown in FIG. 2b, the second grid support plate 11e supports the upper end portion of the square tubes 11b and has a similar structure to that of the first grid support plate 11f. That is to say, a plurality of grid holes 41b is formed at the second grid support plate 11e. A structure (not shown) for supporting the upper end portion of the square tubes 11b is provided at one surface (lower surface) of the side where the square tubes 11b are disposed. This structure is formed in the same manner as the structure of the first grid support plate 11f which supports the lower end portions of the square tubes 11b.

After the core 7 (without fuel assembly) is formed in the pressure vessel 6 shown in FIG. 1, this type of chimney 11 is installed above the core 7. At this time, the chimney 11 may be assembled inside the pressure vessel 6, or the chimney 11 may assembled in advance at the outside of the pressure vessel 6 and then installed inside the pressure vessel 6. Also, the material of the members forming the chimney 11 (the first grid support plate 11f, the second grid support plate 11e, the square tubes 11b, the chimney shell 11d and the like) may be that used in the conventional reactor, and any material with excellent heat resistance and anticorrosive properties may be suitably selected and used. Examples of the material include stainless steel, zirconium alloys, titanium alloys and the like.

The square tubes 11b may for example be formed by processing a plate-like member. (a)-(d) of FIG. 3 which will be referred to here shows the steps for manufacturing the square tubes.

Figure 3:
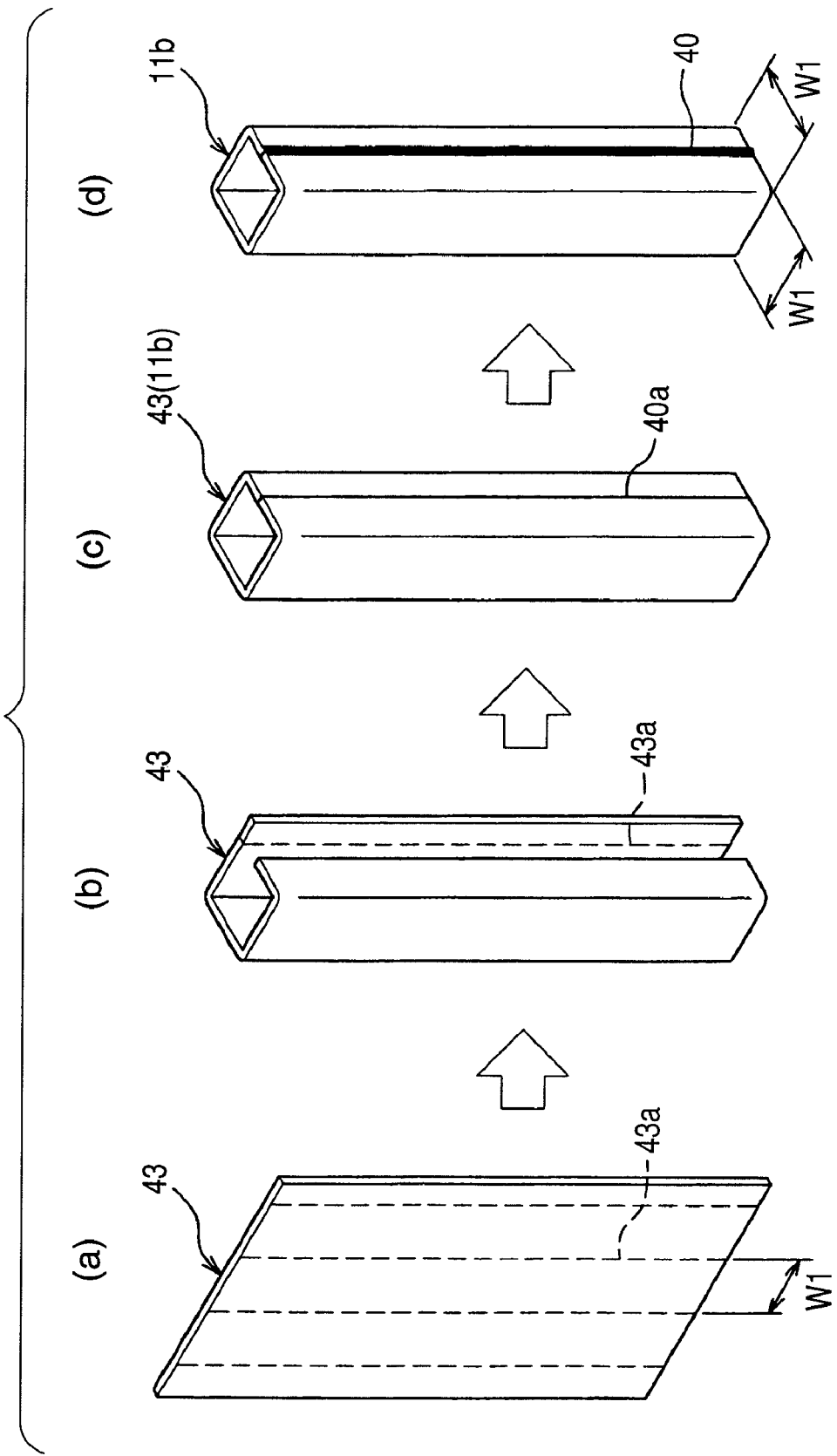
FIG. 3 is an explanatory diagram showing the production steps for the square tube.

As shown in (a) of FIG. 3, four parallel bending lines 43a with intervals corresponding to the width W1 of the square tube 11b (see FIG. 2b) are established on the standard plate member 43. Then, as shown in (b) of FIG. 3, the plate member 43 is bent inward at 90 degrees along the bending lines 43a. As a result, as shown in (c) of FIG. 3, a square tube 11b is formed which has the seam 40a of the plate member 43 at one side surface. The seam 40a extends along the longitudinal direction of the square tube 11b. As shown in (d) of FIG. 3, a square tube 11b with a width W1 is obtained by welding the plate members along the seam 40a. In the square tube 11b obtained in this manner, the welding line 40 which is aligned with the seam 40a (see (c) of FIG. 3) is set. The welding line 40 is preferably set at a position which is 1/8 to 3/8 of the width W1 from the edge of the square 111b to the side surface.

Next, the operation of the reactor 1 of this embodiment will be described with reference to FIG. 1 and FIG. 2a to FIG. 2c as appropriate, and the operational effects of this reactor 1 will be described.

As shown in FIG. 1, in this reactor 1, the coolant supplied from the feed water inlet nozzle 17 to the reactor pressure vessel 6 is mixed with the saturated water separated by the steam separator 12. The coolant descends the downcomer 9 in the direction indicated by the arrow A and flows into the core shroud 8 from the flow path formed by the space (not shown) in the shroud leg 8a. As a result, the coolant is heated in the core 7. The heated coolant flows in the flow state of saturated two-phase flow including gas and liquid in the direction indicated by the arrow B. That is to say, the coolant is introduced in the chimney shell 11d (see FIG. 1) via the grid hole 41a (see FIG. 2b) of the first grid support plate 11f of the chimney 11. Then, as shown in FIG. 2a, the coolant that flows into the grid hole 41a in which there are no square tubes 11b passes through the region enclosed by the side surfaces of four square tubes 11b (side walls of the square tubes 11b) and is introduced into the upper plenum 11c (see FIG. 1) through the grid hole 41b of the second grid support plate 11e in which there are no square pipes 11b. Meanwhile, the coolant passed through the grid holes 41a in which there are square tubes 11b (see FIG. 2a and FIG. 2c) is supplied into the square pipes 11b and then flows into the upper plenum 11c from the grid hole 41b of the second grid support plate 11e shown in FIG. 2b in which there are square tubes 11b.

In this chimney 11, as shown in FIG. 2a, because the edges of the adjacent square tubes 11b are separated and the space S is formed in between the adjacent square tubes 11b, when the coolant passes through the regions that is enclosed by side surfaces of four square tubes 11b (side walls of the square pipes 11b) inside the chimney shell 11d, the stress originating at the square tubes 11b due to generation of the flow-induce vibration (FIV) is reduced compared with the case where the edges of the square pipes 11b are connected.

As shown in FIG. 1, the coolant of two-phase flow introduced to the upper plenum 11c flows into the standpipe 12b and further is supplied into the steam separator 12. The steam separator 12 separates the coolant of two-phase flow into saturated steam that flows in the direction of arrow C, and saturated water that flows in the direction of arrow D. This separated saturated steam flows through the steam dryer 13 and is then supplied to the turbine 2 through the main steam pipe 16a via the steam outlet nozzle 15 and used for power generation. Also, the separated saturated water is mixed with the coolant in the pressure vessel 6 and then further mixed with the coolant supplied from the feed water inlet nozzle 17. Then the coolant descends the downcomer 9 again to circulate in the pressure vessel 6.

According to the reactor 1 of this embodiment which was described above, when the coolant flows inside the chimney shell 11d, the stress being applied to the square tubes 11b by flow-induce vibration (FIV) is reduced. Thus, the possibility of stress corrosion cracking (SCC) being generated at the square tubes 11b is reduced. This effect is most remarkable at the edges of the square tubes 11b.

According to this reactor 1, the first grid support plate 11f which forms the chimney 11, also functions as the top guide of the conventional reactor, and thus this top guide may be omitted, or may be simplified (made thinner). As a result, the construction cost for the top guide can be eliminated.

Furthermore, in the reactor 1, because each square tubes 11b divides the inside of the chimney shell 11d and is formed a plurality of partitioned flow paths of the coolant above the core 7, unlike the conventional reactor having the flow path partition wall grid in which the plate members are made integral by welding and coolant flow paths are partitioned, the edges of the four corners of each flow path does not need to be welded. Thus, in this reactor 1, the number of welded parts in the chimney 11 can be reduced and therefore the possibility that the SCC will be generated at the welded portions is reduced. Also, the number of productions steps and the manufacturing cost when manufacturing the reactor 1 can be reduced.

According to the reactor 1, by removing the square tubes 11b, removal as one unit as is the case of the flow path partition wall grid in the conventional reactor is avoided. As a result, in this reactor 1, removal of the chimney 11 can be easily performed.

Furthermore, according to the reactor 1, because the square tube 11b which forms the chimney 11b can be easily formed by bending the plate member 43, the chimney 11 itself can be easily produced.

In the reactor 1, because the square tube 11b which forms the chimney 11b is formed by bending the plate member 4, it is sufficient for the welding line 40 for forming the square pipe 11b to be at one location. As a result, the possibility of the SCC being generated is reduced.

Also, in the reactor 1, because the welding line 40 on the square pipe 11b which forms the chimney 11b is set on the side surface of the square pipe 11b, the possibility of the SCC being generated is reduced compared with the case where the welding line is set on the edge of the square tube 11b.

In the reactor 1, because the welding line 40 on the square tube 11b which forms the chimney 11b is set at a position which is $1/8$ to $3/8$ of the width W1 from the edge of the square tube 11b to the side surface, the possibility of the SCC being generated is further reduced.

It is to be noted that the present invention is not to be limited by the above embodiments, and various modifications are possible. In the above embodiment, the square tubes 11b in the chimney 11 are arranged such that one is in every other grid hole 41, but the square tubes 11b may be arranged so that there is one in every 2 or more grid holes 41.

In this embodiment, the chimney 11 is formed of square tubes 11b, but the cross-sectional configuration of the tube is not particularly limited. The outline of the outer side of the cross-section may for example, be circular, elliptical or polygonal (not square).

Also, in this embodiment, square tube 11b is formed by bending one plate member 43, but a pair of plate members 43 which have been bent to form a C-shape may be welded to each other.

In addition, in this embodiment, the upper ends of the square tubes 11b are supported by the second grid support plate 11e, but the member for supporting the square tubes 11b is not particularly limited, and may for example, be flanges formed on the square tubes 11b and these flanges may be joined to each other.

(Handling Method for the Natural Circulation Boiling Water Reactor)

Next, the handling method for the reactor 1 of this embodiment will be described with reference mainly to FIG. 1 and FIG. 4 to FIG. 7b.

Figure 4:
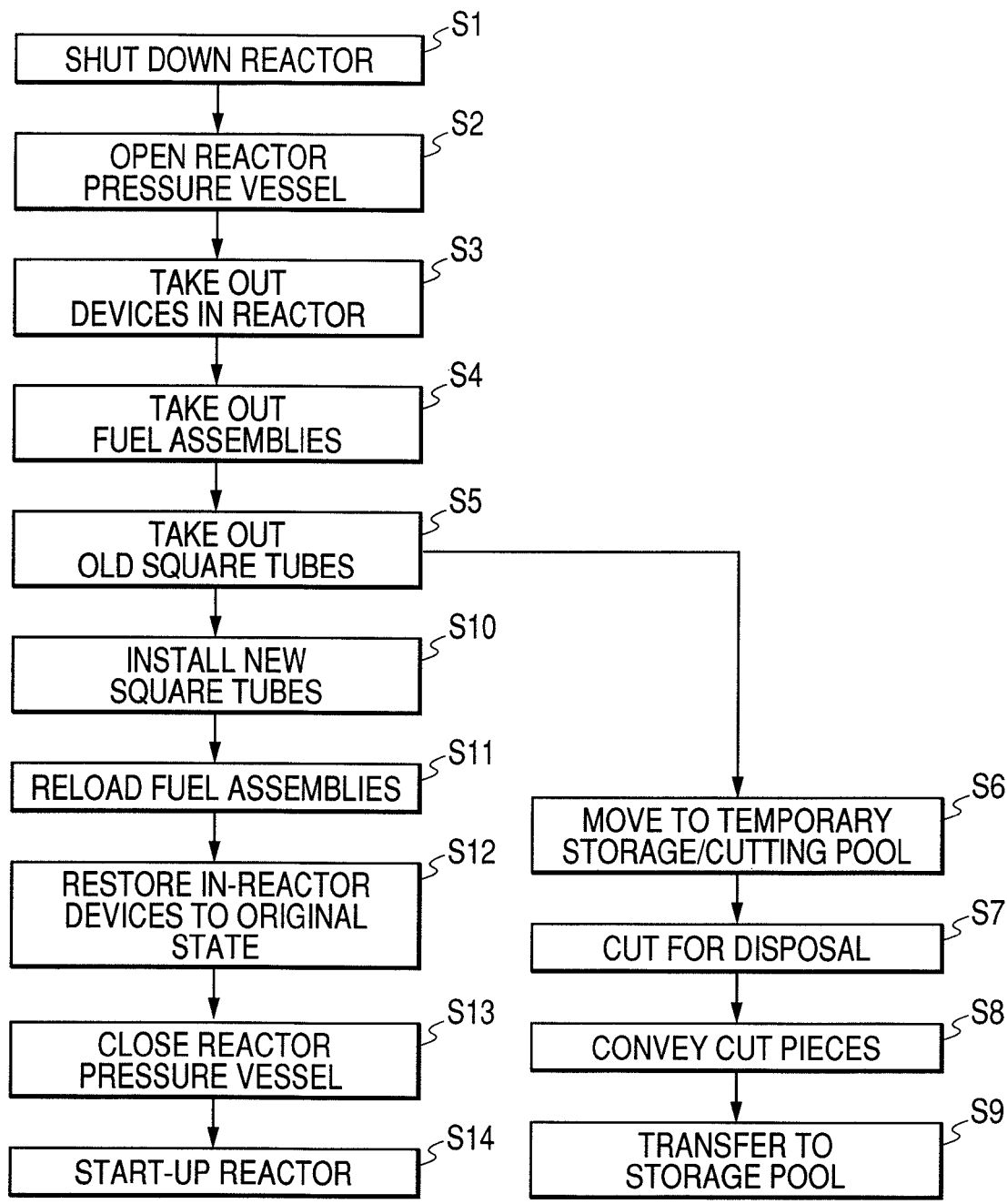
FIG. 4 is a process chart for exchanging the square tube.
Figure 5:
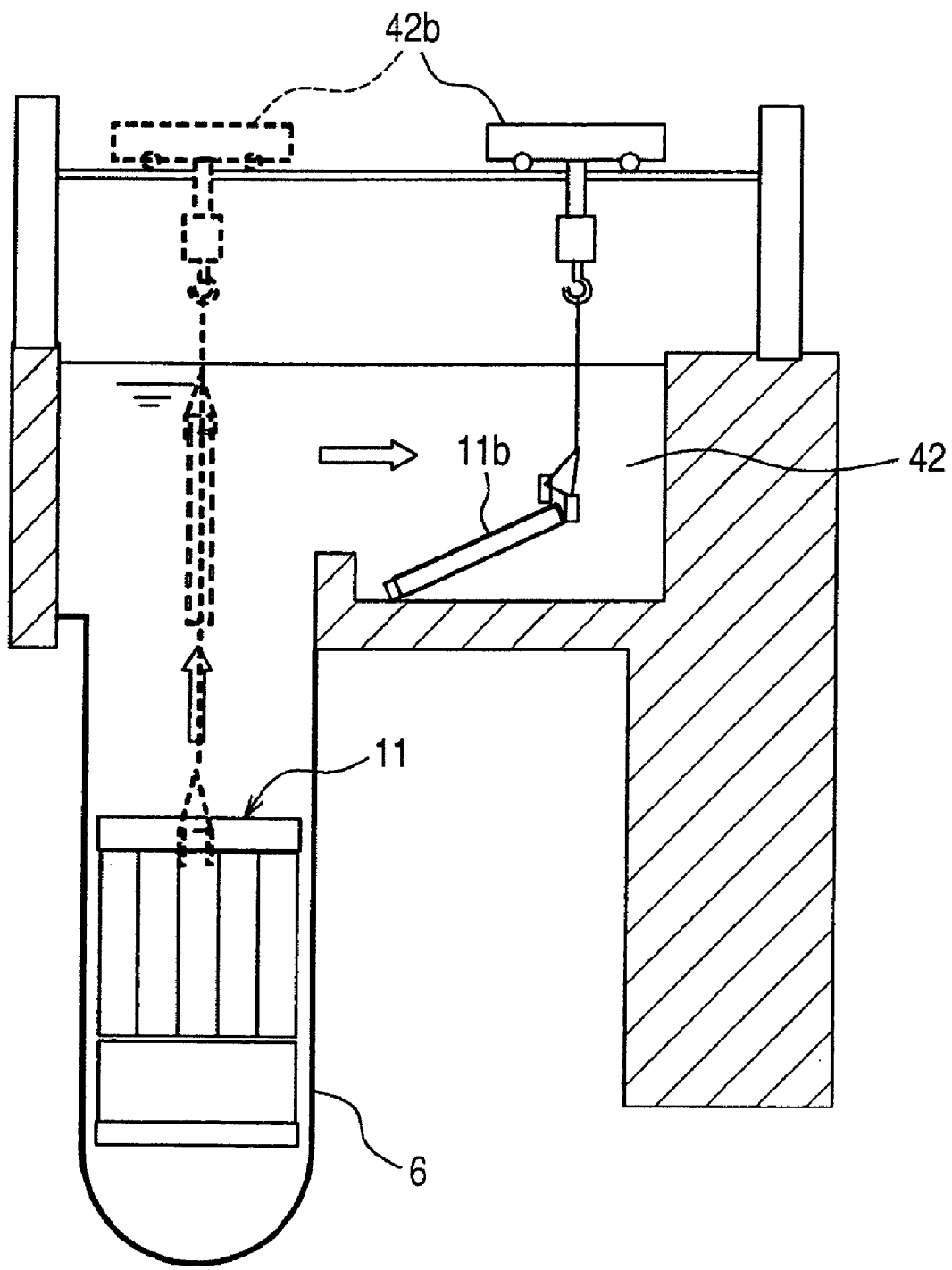
FIG. 5 is an explanatory diagram showing the state where the square tubes are taken out from the reactor pressure vessel.

First, the case in which a square pipe 11b which is a part of the chimney 11 is replaced in the reactor 1 is used as an example for describing the handling method for the reactor 1. FIG. 4 which is used here is a process chart for replacing the square tube, while FIG. 5 shows the state where the square tubes are removed from the reactor.

As shown in FIG. 4, in the case where a predetermined square pipe 11b needs to be replaced, first the operation of the reactor 1 is shut down (Step S1). Then, as shown in FIG. 5, a predetermined water level is maintained in the temporary storage/cutting pool 42 which is a structure attached to the reactor 1. Next, as shown in FIG. 4, the pressure vessel 6 (see FIG. 1) is opened (Step S2). In-reactor devices such as the steam separator 12 and the shroud head 12a and the like (see FIG. 1) which will interfere with the operation of replacing the square tube 11b are taken out from the pressure vessel 6 (Step S3).

Next, fuel assembly 21 is taken out from the core 7 (see FIG. 1) via the grid holes 41b (see FIG. 2(b)) of the second grid support plate 11e which becomes visible when the shroud head 12a is detached (Step S4). The second grid support plate 11e is then taken out from the pressure vessel 6.

Next, the square tube 11b being replaced (inscribed old square tube in FIG. 4) is taken out from the pressure vessel 6 (Step S5). The square tube 11b that has been taken out is carried into the temporary storage/cutting pool 42 and temporarily put in the temporary storage/cutting pool 42 (Step S6). The processes from Step 2 through Step 6 are all performed in the state where the temporary storage/cutting pools 42 (see FIG. 5) are filled with water. As shown in FIG. 5, crane 42b is used in order to take out each of the members from the pressure vessel 6. This is not shown but all of the members that are taken out are temporarily placed in the temporary storage/cutting pool 42.

Next, the square tubes 11b that is temporarily placed in the temporary storage/cutting pool 42 shown in FIG. 5 are cut in the temporary storage/cutting pool 42 for disposal (Step S7), as shown in FIG. 4. The cut pieces are accommodated in a specified cask (not shown), and then conveyed from the temporary storage/cutting pool 42 (Step S8). The cask is transferred to a storing pool (not shown) (Step S9).

On the other hand, the new square tube 11b (inscribed "new square tube" in FIG. 4) is placed inside the pressure vessel 6 using the crane 42b (Step S10). Subsequently, the fuel assembly 21 is placed in the core 7 (see FIG. 1) via the grid hole 41b (see FIG. 2b) of the second grid support plate 11e by the crane 42b (Step S11). The in-reactor devices such as the steam separator 12, the shroud head 12a and the like (See FIG. 1) that have been taken out from the reactor vessel 6 in Step S3 are installed in the reactor vessel 6 and restored to the original state (Step S12). Then the reactor vessel 6 is closed (Step S13). After the water in the temporary storage/cutting pool 42, that is, at least above the reactor vessel 6 has been exhausted, the reactor 1 starts up (Step S14), and thus a series of steps in the method for handling the reactor 1 ends.

Figure 7A:
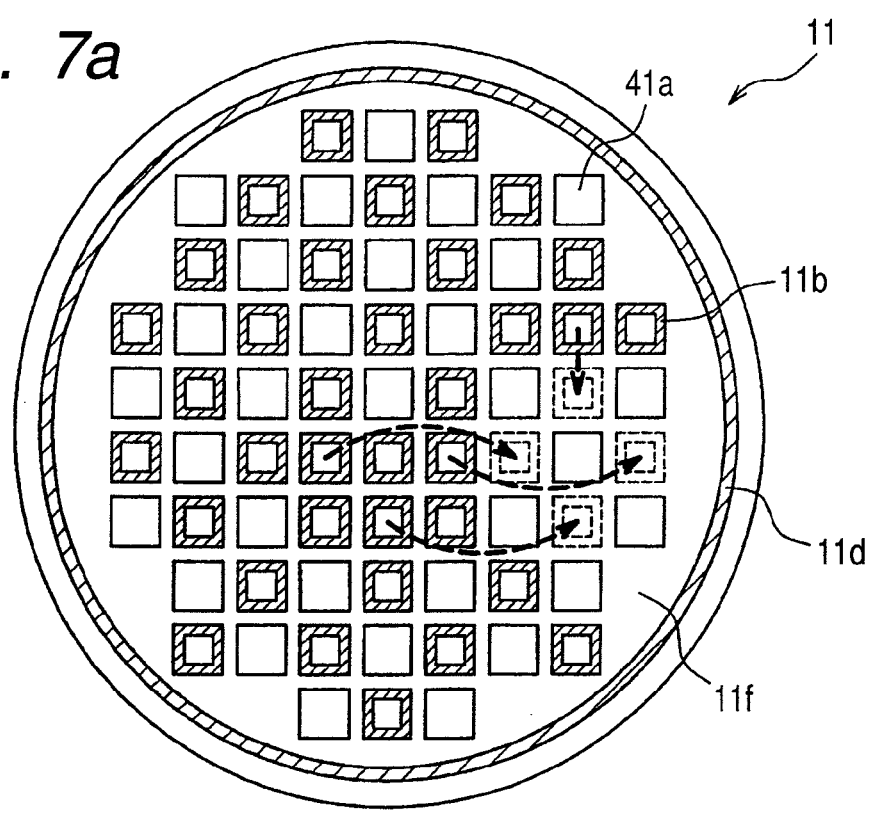
FIG. 7a is an explanatory diagrams showing switching of the square tubes in a handling method for the natural circulation boiling water reactor in FIG. 1.
Figure 7B:
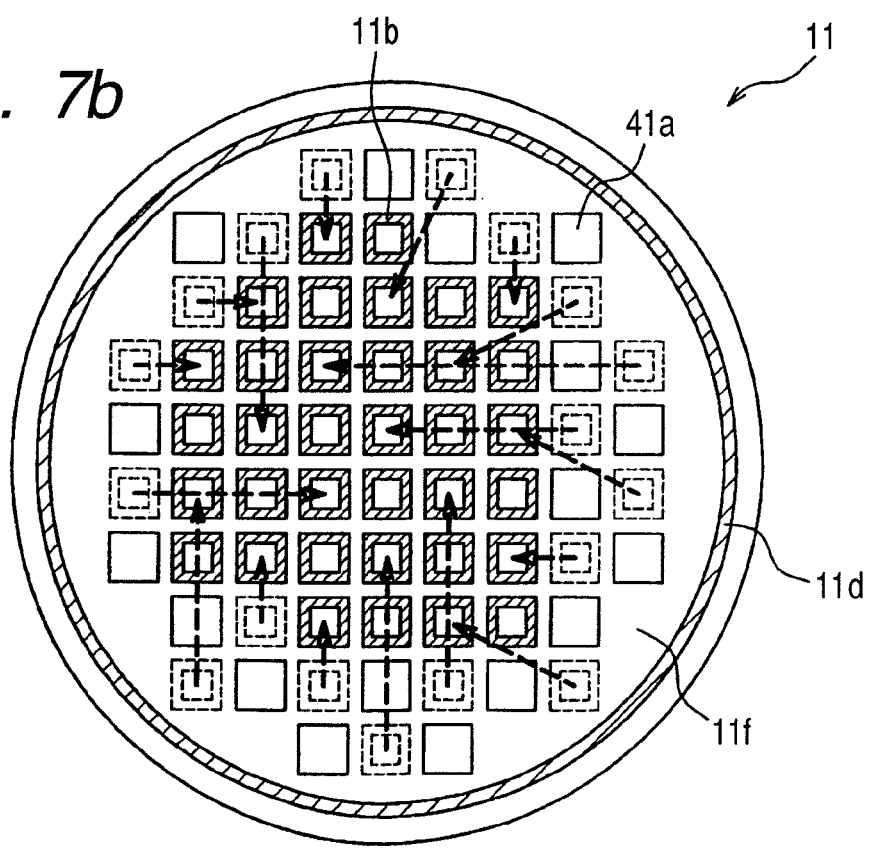
FIG. 7b is an explanatory diagrams showing switching of the square pipes in a handling method according to another embodiment.
Figure 8A:
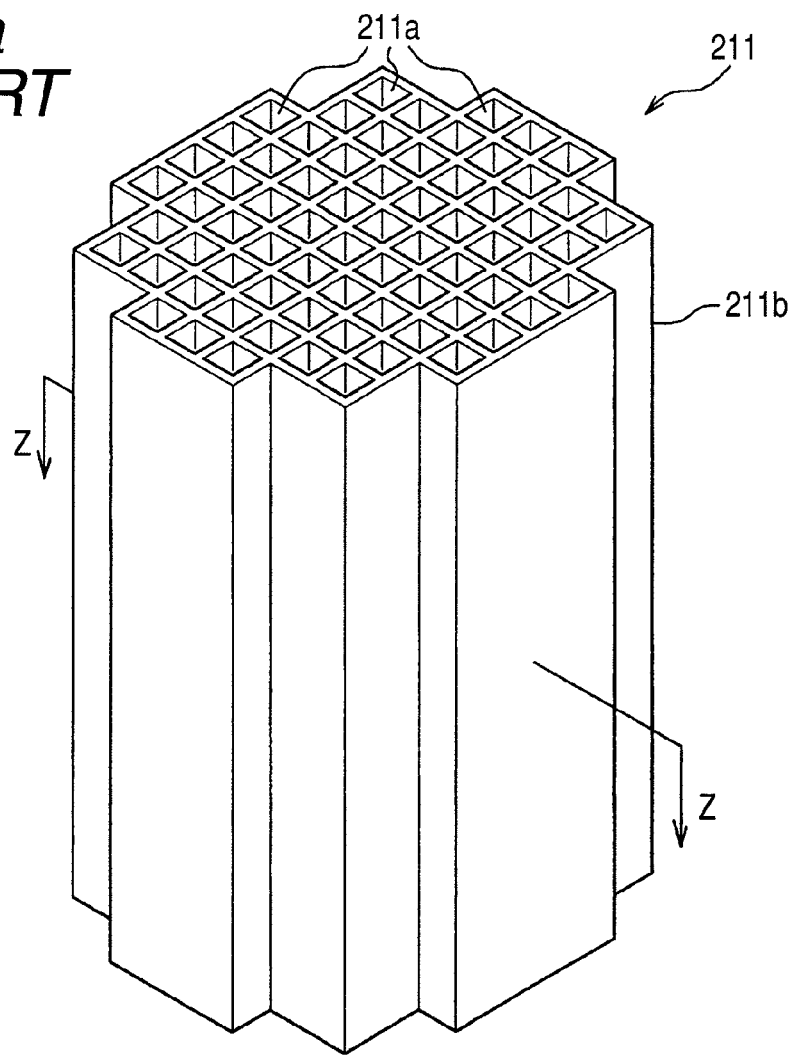
FIG. 8a is a perspective view showing the conventional chimney.
Figure 8B:
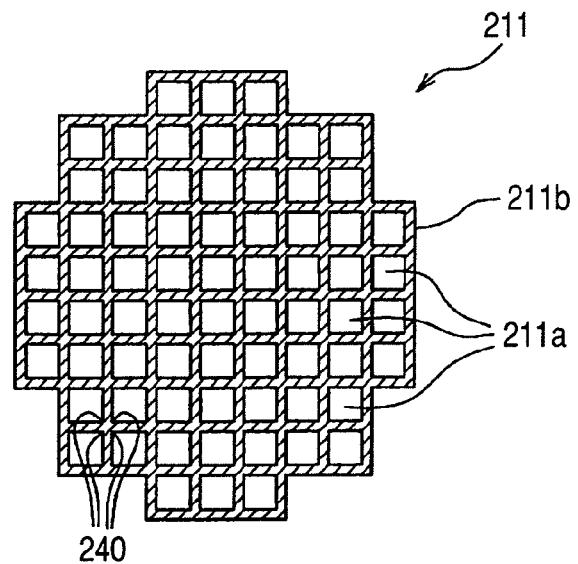

Next, a handling method for the reactor 1 using the example of the case where maintenance and inspection of the reactor 1 is performed, will be described with reference mainly to FIG. 6 and FIGS. 7a and 7b. FIG. 6 shows a process for performing maintenance and inspection. FIG. 7a and FIG. 7b show the state in which the square tubes are switched. It is to be noted that the steps before Step S21 shown in FIG. 6 are the same as Step S1 to Step S4 in FIG. 4 and the steps after Step S23 shown in FIG. 6 are the same as Step S11 to Step S14 in FIG. 4. Thus, these steps are omitted in FIG. 6 and detailed descriptions of these steps are also omitted.

In the handling method for the reactor 1 herein, after the fuel assembly 21 is taken out from the core 7 (see FIG. 1 and Step S4 in FIG. 4), as shown in FIG. 6, the square tubes 11b are shifted (Step S21). More specifically, as shown in FIG. 2a, the predetermined square tubes 11b supported by the first grid support plate 11f are moved in the direction of the broken line arrow. Thus prescribed square tubes 11b are moved into the grid holes 41a which appear between the square tubes 11b. The step of shifting the square tubes 11b is equivalent to the "first step" referred to in the scope of the claims. As shown in the example of FIG. 7a, three square tubes 11b are shifted. As a result, the predetermined square pipes 11b indicated by the broken lines in FIG. 7a are shifted and grid holes 41a appear at the position from which the predetermined square pipes 11b are removed, and space for placing devices used in the maintenance/inspection is secured by removing predetermined square tubes 11b. The maintenance and the inspection of the members in the circumference of the core 7 such as the core shroud 8 and the like (see FIG. 1) can be performed via the grid holes 41a and 41b that was formed (Step S22). "The maintenance and the inspection" herein includes inspection, repair and processing of the members comprising the reactor 1. It is to be noted this step is equivalent to the "second step" referred to in the scope of the claims.

Next, after the maintenance and the inspection of the reactor 1 are completed, by moving each square tube in the direction of the broken line arrow (arrow in a direction of arrow opposite to the direction of the broken line arrow shown in FIG. 2a) shown in FIG. 7a, as shown in FIG. 6, reinstallation of the square tubes 11b is performed (Step S23). That is to say, the square tubes 11b are reinstalled so as to be disposed as shown in FIG. 2a. Subsequently, this series of steps in the handling method for the reactor 1 ends by performing the steps from Step S11 to Step S14 shown in FIG. 4.

It is to be noted that this handling method is not limited to the case where the square tube 11b which is disposed so as to enclose one grid hole 41a is shifted, as shown in FIG. 7a, but as shown in FIG. 7b, the square tubes 11b at the position close to the chimney shell 11d may be shifted in the direction of the broken line arrow.

According to the handling method for the reactor 1 described above, because the square tubes 11b can be removed individually, there is no need for them to be taken out as one unit as is the case of the flow path partition wall grid in the conventional reactor. As a result, according to this handling method, replacement and repair of the structural members (square tubes 11b and the like) of the chimney 11 as well as maintenance and inspection of the structural members of the reactor 1, particularly the members around the core 7, can be performed easily.

What is claimed is:

1. A natural circulation boiling water reactor in operation having a chimney comprising:
    a cylindrical chimney shell disposed above a core in a reactor pressure vessel;
    a plurality of square tubes, each square tube having a lower end and an upper end, disposed so as to extend in a vertical direction in said chimney shell; and
    a first grid support plate, disposed in said reactor pressure vessel above said core, arranged to have a plurality of first grid holes and a plurality of second grid holes so that said first grid holes and said second grid holes are arranged alternately in rows and columns;
    wherein said lower ends of said square tubes are disposed and detachably supported by said second grid holes of said first grid support plate such that said second grid hole faces an opening at said lower end of said square tube, and said square tubes are not disposed at positions of said first grid holes such that said first grid holes are vacant without any of said square tubes being disposed thereat;
    wherein said square tubes are disposed with respect to said second grid holes in the rows and columns so as to be spaced from each other at an interval which exceeds a width of one of said square tubes;
    wherein a gap is formed between edges of said square tubes of said adjacent rows which face each other at least along a diagonal of a cross section of the square tubes; and
    wherein a two-phase flow path communicated with said core includes said first grid holes of said first grid support plate where said square tubes are not disposed and outer side surfaces of said square tubes extending upwardly from said second grid holes of said first grid support plate where said square tubes are disposed.

2. The natural circulation boiling water reactor according to claim 1,
    wherein each of said square tubes is a bent plate member having a welded seam which extends in a longitudinal direction of said square tube.

3. The natural circulation boiling water reactor according to claim 2, wherein a welding line for said welded seam is formed at one of the outer side surfaces of said square tube, and is positioned between ⅛ and ⅜ of the width of the one of the outer side surfaces.

4. The natural circulation boiling water reactor according to claim 1, wherein said two-phase flow path communicated with said core further includes an inside of said square tubes.

5. The natural circulation boiling water reactor according to claim 1, further comprising:

a second grid support plate in said reactor pressure vessel, disposed above said first grid support plate, having a plurality of third grid holes and a plurality of fourth grid holes so that said third grid holes and said fourth grid holes are arranged alternately in rows and columns corresponding to the alternate arrangement of said first grid holes and said second grid holes of said first grid support plate, respectively;

wherein said upper ends of said square tubes are detachably supported by said fourth grid holes such that said fourth grid hole faces an opening at said upper end of said square tubes.

6. The natural circulation boiling water reactor according to claim 1, further comprising a plurality of fuel assemblies disposed in the core, wherein said fuel assembles are configured to be inserted through said first and second grid holes.

7. The natural circulation boiling water reactor according to claim 1, wherein said square tubes are spaced from each other at an interval which exceeds a width of one of said square tubes in each row such that an arrangement of said square tubes disposed in one row are offset with respect to an arrangement of said square tubes disposed in an adjacent row.

8. The natural circulation boiling water reactor according to claim 1, wherein said first grid holes and said second grid holes are substantially of a same size enabling said lower ends of said square tubes to be disposed and detachably supported thereby.

* * * * *